Dec. 17, 1963   R. E. ULVESTAD   3,114,564
TRAILER HITCH
Filed March 19, 1962   2 Sheets-Sheet 1
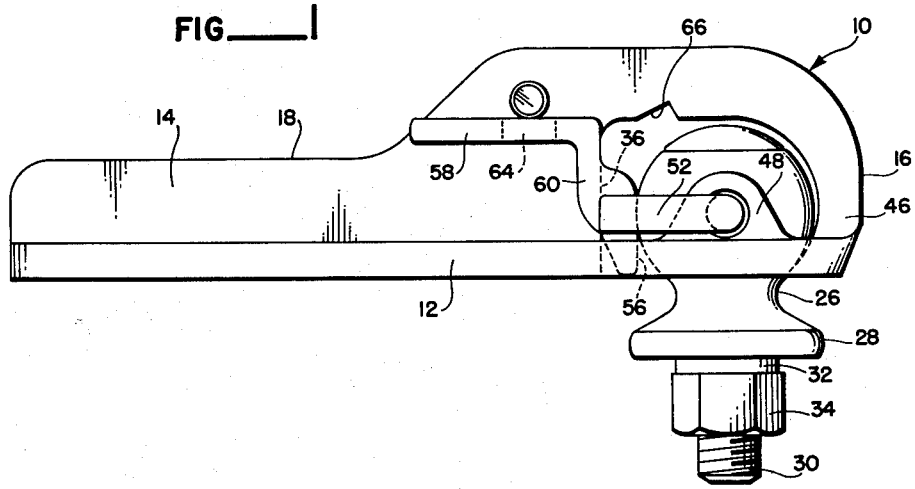
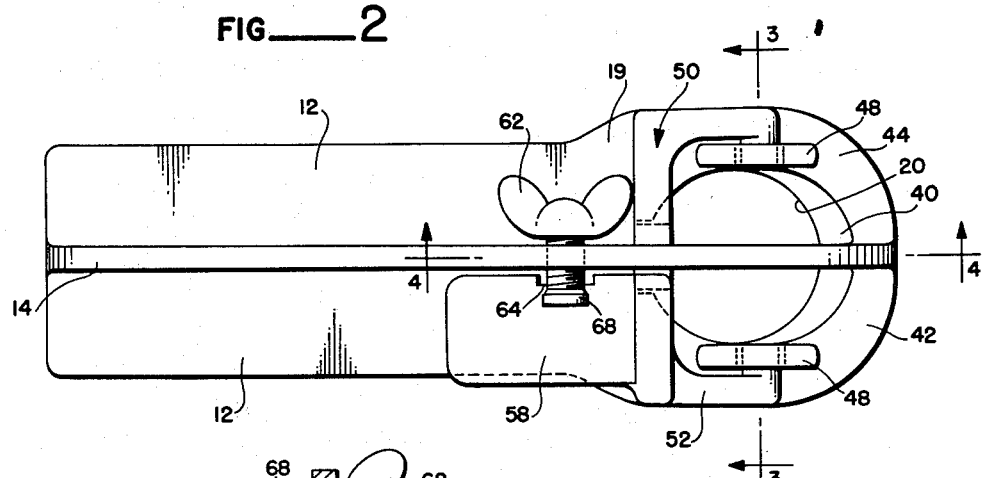
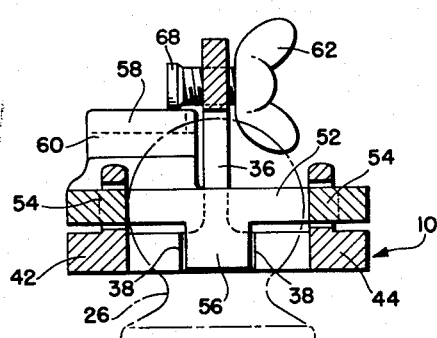
RANDALL E. ULVESTAD
INVENTOR.

Dec. 17, 1963   R. E. ULVESTAD   3,114,564
TRAILER HITCH
Filed March 19, 1962   2 Sheets-Sheet 2
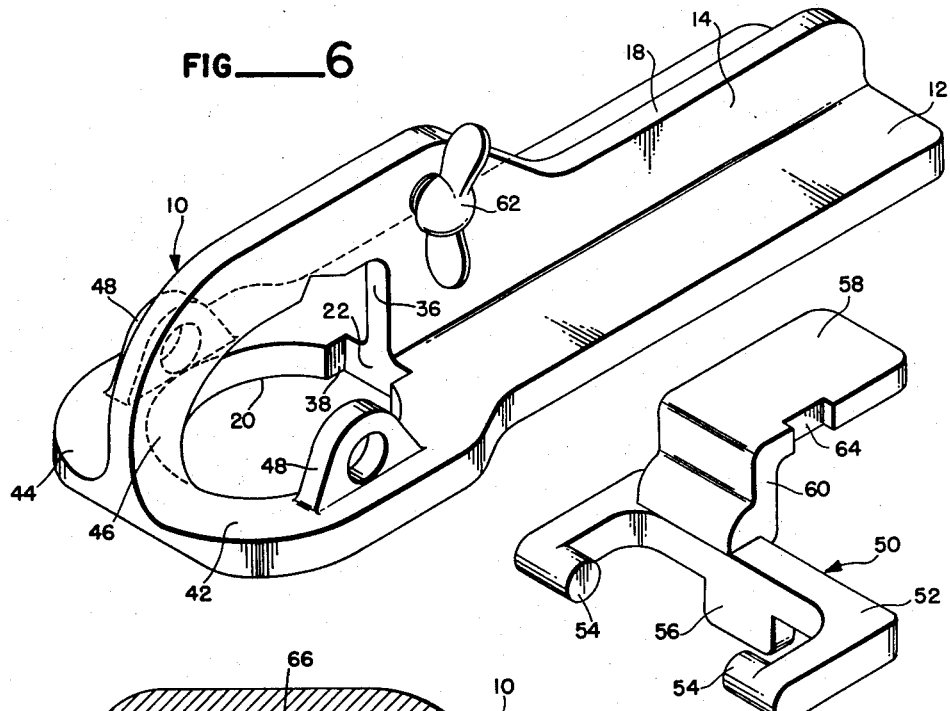
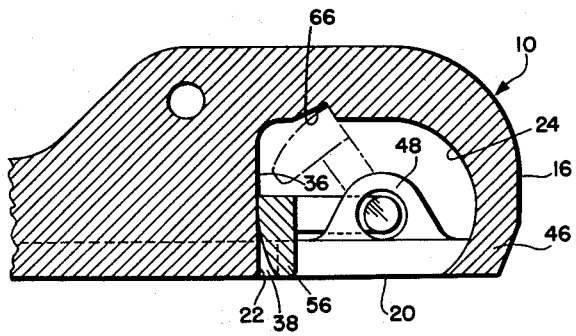
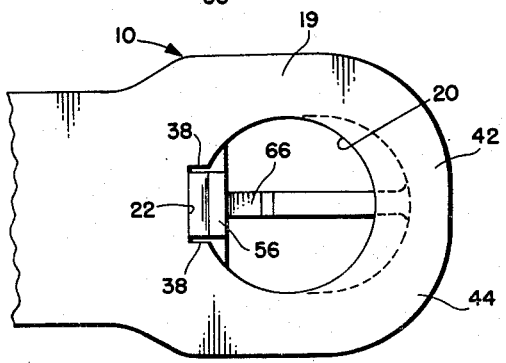
RANDALL E. ULVESTAD
INVENTOR.

United States Patent Office 3,114,564
Patented Dec. 17, 1963

3,114,564
TRAILER HITCH
Randall E. Ulvestad, 3912 SW. Portland St.,
Seattle 16, Wash.
Filed Mar. 19, 1962, Ser. No. 180,544
7 Claims. (Cl. 280—512)

This invention relates to a new and novel concept in a vehicular coupling and more specifically to an automatically connecting tractor and trailer hitch utilizing a fixed ball joint and a socket portion which does not envelop the ball in the conventional manner. The only known types of ball and socket trailer hitches involve a socket which actually envelops more than half of the ball. Such known devices employ means for swinging a portion of the socket away from the ball in order to uncouple the hitch. So far as is known all of the currently used types of hitches pivot such swinging socket portion about a point non-centric with the ball. In some instances the pivot point is located at some distance from the ball. The design of heretofore known devices is such that in order to secure the coupling the pivoted portion of the socket must be actuated by hand thus eliminating an automatic coupling action.

This invention involves an automatic latching mechanism which pivots on a horizontal axis generally centric with the center of the ball. Furthermore the socket is not formed with a spherical surface but utilizes an inverted T-shaped connector with a hole or opening cut through the horizontal base section and extending up into the vertical web. Thus, the connector might be said to more nearly resemble a cage rather than a socket though the function is for all practical purposes the same.

Accordingly, it is a prime object of this invention to provide a tractor and trailer hitch which is extremely simple in design, rugged in construction and inexpensive to produce.

Another object of this invention is to provide a tractor and trailer hitch which employs a latching feature which pivots about an axis coincident with the ball center.

Still another object of this invention is to provide a trailer hitch in which the coupling action is completed by merely dropping the hitch connector on to the ball.

Yet another object of this invention is to furnish a trailer hitch which uses a connector more nearly resembling a cage than a conventional socket.

A further object of this invention is to supply a trailer hitch in which the only manual manipulation required to effect a complete coupling is the turning of a locking bolt.

These, together with other objects and advantages which will become subsequently apparent, reside in the details of construction and operation as more fully hereinafter described and claimed, reference being had to the accompanying drawings, forming a part hereof, wherein like numerals refer to like parts throughout, and in which:

FIGURE 1 is a side elevational view of this trailer hitch showing the connector coupled to the ball;

FIGURE 2 is a top plan view also showing the connector and ball joined;

FIGURE 3 is a front elevational view in a cross section taken along line 3—3 of FIGURE 2 and showing principally the latching mechanism;

FIGURE 4 is a partial side elevational view taken in cross section along line 4—4 of FIG. 2;

FIGURE 5 is in a bottom plan view of the connector showing the latch and how it appears with respect to the ball-receiving hole;

FIGURE 6 is a perspective view of the connector without the latch; and

FIGURE 7 is a perspective view of the latch.

Referring now to FIGS. 1 and 2 it will be seen that the connector, generally designated by number 10, is made of heavy gauge metal of an inverted T-shape design. The bottom or base 12 has extending vertically upward therefrom the web 14. Said web is enlarged at the forward or connecting end 16 while the rear portion 18 is of lesser height. The base 12 also enlarges in a horizontal plane to form enlarged base portion 19.

FIG. 5 shows circular hole 20 formed in enlarged base portion 19. FIG. 4 shows that the opening in base 12 extends into web 14. The forward surface 24 of the opening in web is circular and conforms to the radius of curvature of the opening 20 in base 12.

It will be apparent by reference to the drawings that the opening is made in the connector to receive the ball 26 which has mounting collar 28, threaded shank 30, washer 32 and mounting nut 34. Ball 26 is, of course, attached to the towing vehicle. Opening 20 is just large enough to admit ball 26. Surface 24 after curving upwardly around the ball extends generally rearwardly in web 14 and then drops perpendicularly along the web in the form of rear surface 36.

It will be noted from FIGS. 3, 5 and 6 that circular opening 20 is notched along a portion facing the rear of the connector. Two offset surfaces 38 extend generally rearwardly from opening 20 of the connector for a short distance of perhaps ⅛ to ¼ inch to form a depressed surface 22 in the base 12. Rear surface 36 and depressed surface 22 blend to provide a single unbroken surface in the rear opening formed in the connector. Because of the nature of the single rear surface the rearmost point of ball 26 when placed in the opening will be spaced from surface 36. The notch is centered and is about ¾ inch long between offset surfaces 38.

FIGS. 1, 2, 4 and 5 illustrate how the curved nature of forward web surface 24 combines with opening 20 in base 12 to form a sloping retaining surface 40 which conforms generally to the radius of curvature of surface 24. It will be seen, however, that the lower edge or opening 20 in the base is offset rearwardly of the upper edge of opening 20 to provide the surface 40. Stated alternatively, the upper surface of opening 20 is forwardly offset of the bottom surface of opening 20. Retaining surface 40 gradually merges from its most forward point into a substantially vertical surface at the sides thereof (see especially FIGS. 2 and 3).

The nature of the openings in the connector base and web form what might be loosely termed a claw. The horizontal claws 42 and 44 are provided in enlarged base section 19 and the vertical claw 46 is formed from enlarged web section 16. The upper surface of base portion 12 is provided with two upstanding bearings or hinges 48. The hinges 48 are located so that each one is beside the opening in base 12 and so that the inside face of each hinge is approximately flush with the side wall of said opening. Hinges 48 are provided with holes which are aligned one with the other on the same axis, the purpose of which will be described hereinafter.

It will be understood that the ball 26 slips readily into the connector 10 and that the so-called claws actually bear the load stresses. However, it is necessary to provide a locking or latching mechanism in conjunction with the connector so that the ball and connector will not slip free of each other.

To this end there is provided a latching device, generally referenced by number 50, which locks ball 26 and connector 10 together. Latching device 50 is generally comprised of a U-shaped yoke 52 which has a wide substantially straight base portion and two relatively short arms. The free ends of the arms are turned inwardly to form pivots or journals 54 which are round and which are received in the holes in hinges 48. The ends of said pivots are approximately flush with the inner faces of hinges 48 so that said pivots do not contact ball 26. The holes in hinges 48, the pivots 54 and the center of ball 26 generally coincide on a single axis when the ball 26 is in its locked position as best shown in FIGURE 1. Hinges 48 can be seen to provide a bearing function as well as a hinge service. Said hinges prevent the ball 26 from moving sideways and thus help maintain said ball in a central position.

The yoke 52 of latching mechanism 50 has depending from the underside as an integral part thereof a latch 56 which is shaped to be received in the connector notch. The latch 56 is as wide as the base portion of U-shaped yoke 52 and can be seen to generally abut the notch surface 22 on its rear side. A latching handle 58 is secured to yoke 52 on one side of web 14 by a generally upright handle support member 60. The inner edge of handle 58 is slightly spaced from web 14 so as to allow the handle to be moved up and down without hitting the web.

Yoke 52 rests on the upper surface of base 12 in its latched position. Handle 58 is then in a generally horizontal position and in fact is located somewhat below the top edge of web 14. In order that the latching mechanism 50 may be locked in place a wing nut is threaded through a hole in web 14 to extend over handle 58. In this way the latching mechanism is not permitted to swing upwardly and thus accidentally free itself of ball 26. A shallow depression or notch 64 is provided on the inner edge of handle 58 to permit clearance of the nut 62 without the operator having to unscrew said nut so that the end thereof is flush with web 14. As will be seen the end of the threaded portion of nut 62 is provided with an enlarged tip or bead 68. Said bead 68 obviously prevents nut 62 from accidentally working its way out of its hole in web 14.

Operation of this invention is singularly easy. Nut 62 is threaded away from handle 58 so that the latching mechanism 50 is free to pivot. Ball 26, of course, is attached to a tow vehicle such as a car or truck. Connector 10 is attached to or actually part of the tongue of a vehicle to be towed such as a trailer. The connector is brought down so that ball 26 is received in opening 20. As the ball enters the socket formed in the connector the latching mechanism is pivoted or swung upwardly. Obviously, if the latching mechanism is not unlocked ball 26 will not enter opening 20 since said opening is only large enough for said ball. Latch 56 actually extends into opening 20 to prevent entry of ball 26 if it is locked in place. As the ball enters the socket latching mechanism 50 continues to swing upwardly until the upper surface of yoke 52 enters a triangular shaped notch 66 thus preventing further pivot of said yoke. Ball 26 then moves at first upwardly into the socket. When the middle point of the ball is past opening 20 it then begins to move forwardly against the curved surface 24 and lip or retaining surface 40. The latching mechanism 50 will then fall back to its latching position on the upper surface of base 12 by virtue of its own weight.

It will be understood that the distance between latch 56 and the most forward point of surface 24 approximates the diameter of opening 20. When the ball is sealed in the socket and the latch is down it will be apparent that the ball is unable to move through opening 20 because latch 56 has narrowed said opening to a diameter substantially less than the diameter of said ball. Nut 62 is then threaded all the way into web 14 so that the shank thereof overlies handle 58 to prevent the latching mechanism to swing upwardly and thus release the ball. To release the connector it only is necessary to unlock and swing the latching mechanism upwardly and then lift the connector off the ball.

The foregoing is considered as illustrative only of the principle of this invention. Since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed is:

1. A trailer hitch for use with the upstanding ball member of a ball-type vehicle hitch, comprising:
   (a) a connector member in the form of an inverted T having a generally horizontal base section and a substantially upstanding web member on said base section, said connector member having a front and a rear end;
   (b) a substantially circular opening in the base section near said front end of said connector member, said base section opening having a diameter just large enough to permit the entry thereinto of said ball member of said vehicle hitch;
   (c) said base section opening extending into the web of said connector member and conforming generally at the forward portion thereof to the radius of curvature of said ball member, said web opening being offset forwardly of said base section opening to form a forwardly sloping, upwardly facing retaining surface conforming to the radius of curvature of said base and web section openings, said retaining surface being confined to the forward half of said base section opening;
   (d) a locking means for retaining said ball member in said openings and including a U-shaped yoke pivotally mounted on the upper side of said base section, said yoke having a latch means located at the rear of said base section opening for obstructing said base section opening to less than the diameter of said ball member, whereby when said ball member is inserted into said openings said yoke and latch means are swung upwardly out of said base opening to permit entry of said ball into said openings and to permit said ball member to seat on said retaining surface whereupon said yoke and latch means swing downwardly into normal position to secure said ball member in said openings and on said retaining surface; and
   (e) manually operable latch locking means carried in said web and normally disposed in the path of said yoke to secure said latch means in its ball securing position.

2. A trailer hitch for use with the upstanding ball member of a ball-type vehicle hitch, comprising:
   (a) a connector member in the form of an inverted T having a generally horizontal base section and a substantially upright web member in the center of said base section, said connector member having a front and rear end;
   (b) a substantially circular opening in said base section near said front end of said connector member, said base section opening having a diameter just large enough to permit the entry thereinto of said ball member;
   (c) said base section opening extending into the web member of said connector to form a web section opening, said web section opening conforming generally at the forward portion thereof to the radius of curvature of said ball member, said web section opening being offset forwardly of said base section opening to form in said base section a forwardly sloping, upwardly facing retaining surface, said retaining surface being confined to the forward half of said base section opening, the rear portion of said web section opening extending generally rearwardly to a point generally above the rearmost point of said base section opening;
   (d) a locking means for retaining said ball member in said openings and on said retaining surface including a U-shaped yoke pivotally mounted on the upper side of said base section, the free arms of said yoke being turned inwardly and hinged to said base so that their axis is generally coincident with the center point of said ball when it is secured in the connector, said yoke having a latch means located at the rear of said base section opening for obstructing said base section opening to less than the diameter of said ball member, whereby when said ball member is inserted into said base and web section openings said yoke and latch means are swung upwardly out of said base section opening to permit entry of said ball into said openings and to permit said ball member to seat on said retaining surface whereupon said yoke and latch means swing downwardly into normal position to secure said ball member in said openings and on said retaining surface; and (e) manually operable latch locking means carried in said web section and normally disposed in the path of said yoke to secure said latch means in its ball-securing position.

3. A trailer hitch for use with the upstanding ball member of a ball-type vehicle hitch, comprising:

(a) a connector member in the form of an inverted T having a generally horizontal base section and a substantially upright web member in the center of said base section, said connector member having a front and rear end;

(b) a substantially circular entrance opening in said base section near said front end of said connector member, said entrance opening having a diameter just large enough to permit entry thereinto of said ball member;

(c) said entrance opening extending into the web member of said connector to form a web section opening, said web section opening conforming generally at the forward portion thereof to the radius of curvature of said ball member, said web section opening being offset forwardly of said entrance to form in said base section a forwardly sloping, upwardly retaining surface, said retaining surface being confined to the forward half of said entrance opening, the rear portion of said web section opening extending generally rearwardly to a point generally above the rearmost point of said entrance opening;

(d) a locking means for retaining said ball member in said openings and on said retaining surface including a U-shaped yoke means having a yoke base and forwardly extending arms pivotally mounted on the upper side of said base section, a pair of hinge means attached to the base section with one of said pair on each side of said openings, the free ends of said yoke arms being turned inwardly and pivotally held in said hinge means so that their axis is generally coincident with the center point of said ball when it is secured in the connector, the yoke base extending across the top of the base section through the rear of said web section opening, said yoke means having a depending latch means on said yoke base located at the rear of said entrance opening for obstructing said entrance opening to less than the diameter of said ball member, whereby when said ball member is inserted into said entrance and web section openings said yoke means and latch means are swung upwardly out of said entrance opening to permit entry of said ball into said openings and to permit said ball member to seat on said retaining surface whereupon said yoke and latch means swing downwardly into normal position to secure said ball member in said openings and on said retaining surface; and (e) manually operable latch locking means carried in said web section and normally disposed in the path of said yoke means to secure said latch means in its ball securing position.

4. A trailer hitch for use with the upstanding ball member of a ball-type vehicle hitch, comprising:

(a) a connector member in the form of an inverted T having a generally horizontal base section and a substantially upright web member along the center of said base section;

(b) a substantially circular entrance opening in said base section near the front end of said connector member, said entrance opening being large enough to admit entry of said ball member;

(c) said entrance opening extending into said web member to define a web section opening, said web section opening conforming generally at the forward portion thereof to the radius of curvature of said ball member, said web section opening being offset forwardly of said entrance opening to form a forwardly and upwardly sloping retaining surface which is confined generally to the forward half of said entrance opening, the rear portion of said web section opening extending generally rearwardly to a point generally above the rearmost point of said entrance opening; and (d) locking means for retaining said ball member in said opening and on said retaining surface including a U-shaped yoke pivotable on the upper surface of said base section about an axis generally coincident with the center point of said ball member when it is secured in the connector, said yoke having a depending latch means extending into the rearmost area of said entrance opening for obstructing said entrance opening to less than the diameter of said ball member.

5. A trailer hitch for use with the upstanding ball member of a ball-type vehicle hitch, comprising:

(a) a connector member in the form of an inverted T having a generally horizontal base section and a substantially upright web member along the center of said base section;

(b) an entrance opening in said base section near the front end of said connector member, said entrance opening being large enough to admit entry of said ball member;

(c) said entrance opening extending into said web member to define a web section opening, said web section opening conforming generally at the forward portion thereof to the radius of curvature of said ball member, said web section opening being offset forwardly of said entrance to form a forwardly and upwardly sloping retaining surface which is confined generally to the forward half of said entrance opening, the rear portion of said web section opening extending generally rearwardly to a point generally above the rearmost point of said entrance opening; and (d) locking means for retaining said ball member in said openings and on said retaining surface including a U-shaped yoke means pivotable on the upper surface of said base section about an axis generally coincident with the center point of said ball member when it is secured in the connector, said yoke having a latch means thereon for obstructing said entrance opening to less than the diameter of the said ball member.

6. A trailer hitch for use with the upstanding ball member of a ball-type vehicle hitch, comprising:

(a) a connector member in the form of an inverted T having a generally horizontal base section and a substantially upright web member in the center of said base section, said connector member having a front and rear end;

(b) an entrance opening in said base section near said front end of said connector member, said entrance opening being sufficiently large enough to permit entry thereinto of said ball member;

(c) said entrance opening extending into the web member of said connector to form a web section opening, said web section opening conforming generally at the forward portion thereof to the radius of curvature of said ball member, said web section opening being offset forwardly of said entrance to form in said base section a forwardly sloping, upwardly facing retaining surface, said retaining surface being confined to the forward half of said entrance opening, the rear portion of said web section opening extending generally rearwardly to a point generally above of the rear-most point of said entrance opening;

(d) a locking means for retaining said ball member in said openings and on said retaining surface including a U-shaped yoke means having a yoke base and forwardly extending arms pivotally mounted on the upper side of said base section, a pair of hinge means attached to the base section with one of said pair on each side of said openings, the free ends of said yoke arms being turned inwardly and pivotally held in said hinge means so that their axis is generally coincident with the center point of said ball when it is secured in the connector, the yoke base extending across the top of the base section through the rear of said web section opening, said yoke means having a latch means on said yoke base for obstructing said entrance opening to less than the diameter of said ball member, whereby when said ball member is inserted into said entrance and web section openings said yoke means and latch means are swung upwardly out of said entrance opening to permit entry of said ball into said openings and to permit said ball member to seat on said retaining surface whereupon said yoke and latch means swing downwardly into normal position to secure said ball member in said openings and on said retaining surface; and (e) manually operable latch locking means carried in said web section and normally disposed in the path of said yoke means to secure said latch means in its ball securing position.

7. A trailer hitch for use with the upstanding ball member of a ball-type vehicle hitch, comprising:

(a) a connector member in the form of an inverted T having a generally horizontal base section and a substantially upright web member in the center of said base section, said connector member having a front and rear end;

(b) an opening in said base section near said front end of said connector member, said base section opening being sufficiently large enough to permit the entry thereinto of said ball member;

(c) said base section opening extending into the web member of said connector to form a web section opening, said web section opening conforming generally at the forward portion thereof to the radius of curvature of said ball member, said web section opening being offset forwardly of said base section opening to form in said base section a forwardly sloping, upwardly facing retaining surface, said retaining surface being confined to the forward half of said base section opening, the rear portion of said web section opening extending generally rearwardly to a point generally above of the rear-most point of said base section opening;

(d) a locking means for retaining said ball member in said openings and on said retaining surface including a U-shaped yoke pivotally mounted on the upper side of said base section, the free arms of said yoke being turned inwardly and hinged to said base so that their axis is generally coincident with the center point of said ball when it is secured in the connector, said yoke having a latch means for obstructing said base section opening to less than the diameter of said ball member, whereby when said ball member is inserted into said base and web section openings said yoke and latch means are swung upwardly out of said base section opening to permit entry of said ball into said openings and to permit said ball member to seat on said retaining surface whereupon said yoke and latch means swing downwardly into normal position to secure said ball member in said openings and on said retaining surface; and (e) manually operable latch locking means carried in said web section and normally disposed in the path of said yoke to secure said latch means in its ball-securing position.

References Cited in the file of this patent

UNITED STATES PATENTS

| 2,326,466 | Kitterman | Aug. 10, 1943 |
| 2,470,870 | Scholten | May 24, 1949 |
| 2,833,564 | Brown | May 6, 1958 |